Figure 2:
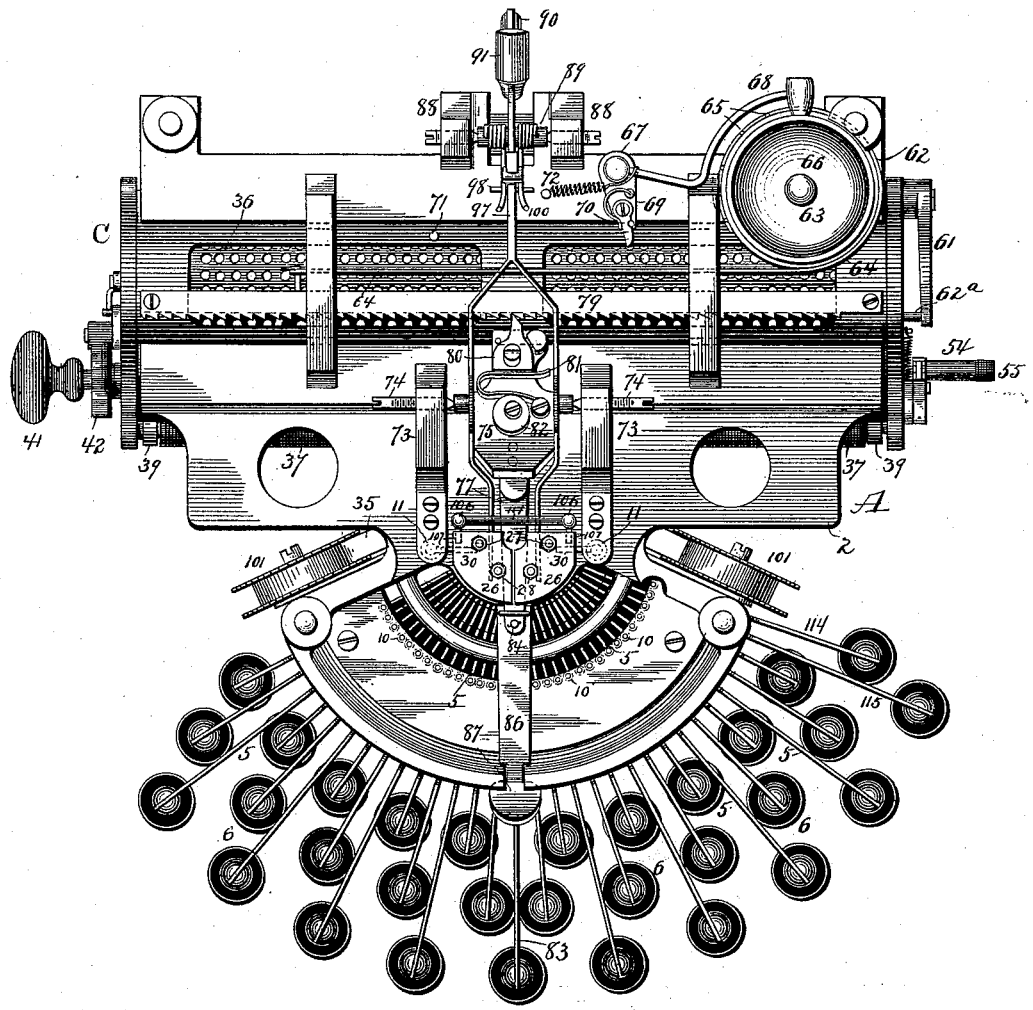

(No Model.) 6 Sheets—Sheet 1.
R. W. UHLIG.
TYPE WRITING MACHINE.
No. 593,789. Patented Nov. 16, 1897.
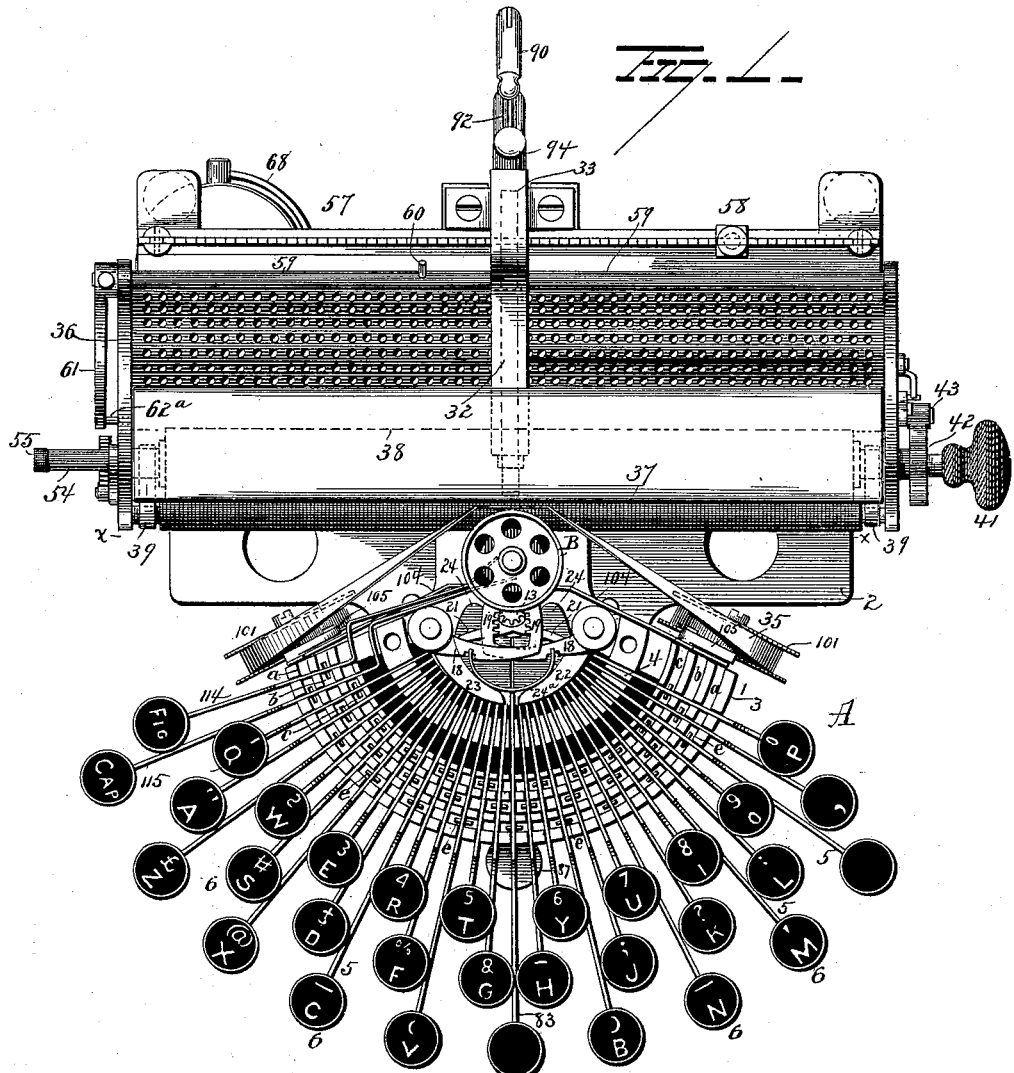
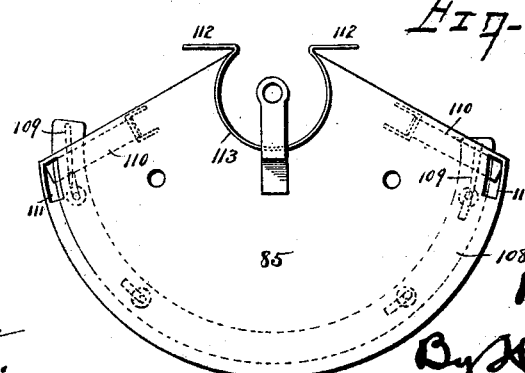
Witnesses
E. J. Nottingham
G. F. Downing
Inventor
R. W. Uhlig
By H. A. Seymour
Attorney (No Model.)  R. W. UHLIG.  6 Sheets—Sheet 2.
TYPE WRITING MACHINE.

No. 593,789.    Patented Nov. 16, 1897.

Witnesses
E. J. Nottingham
G. F. Downing

Inventor
R. W. Uhlig
By H. A. Seymour
Attorney (No Model.)  6 Sheets—Sheet 3.
R. W. UHLIG.
TYPE WRITING MACHINE.
No. 593,789. Patented Nov. 16, 1897.
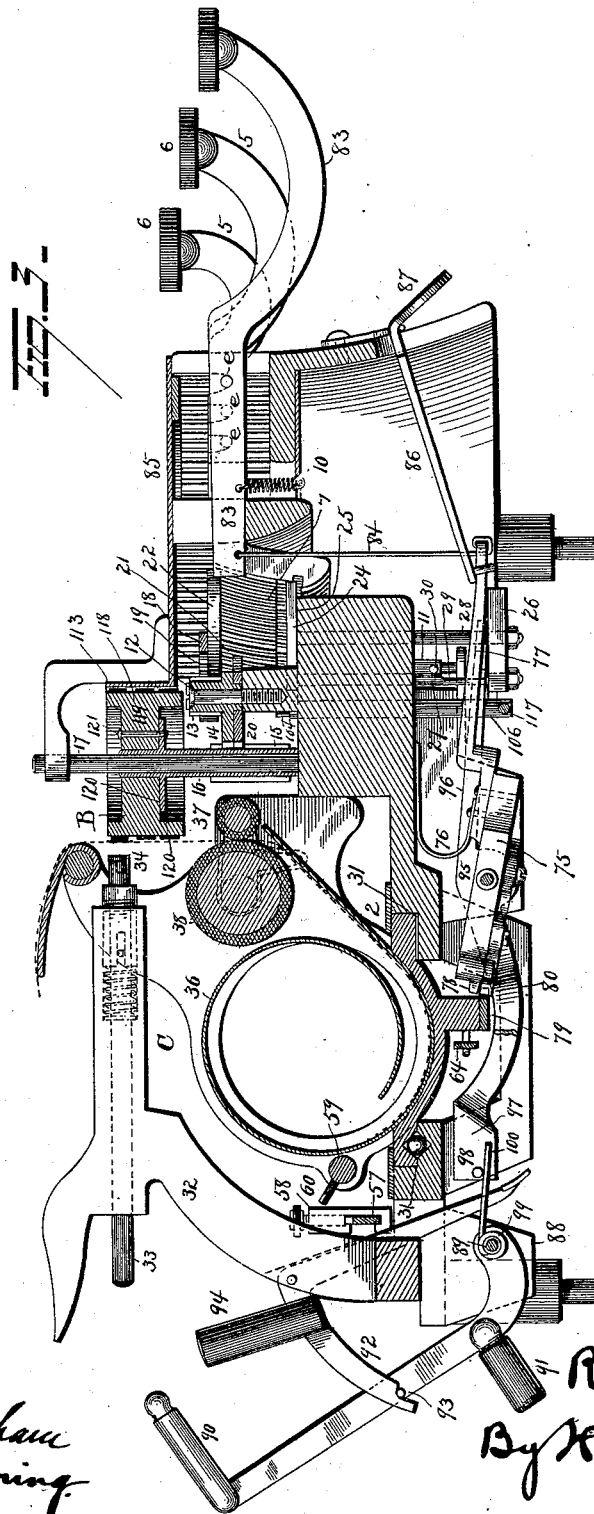
Witnesses
Ed Nottingham
G. F. Downing
Inventor
R. W. Uhlig
By H. A. Seymour
Attorney (No Model.) 6 Sheets—Sheet 4.
R. W. UHLIG.
TYPE WRITING MACHINE.
No. 593,789. Patented Nov. 16, 1897.
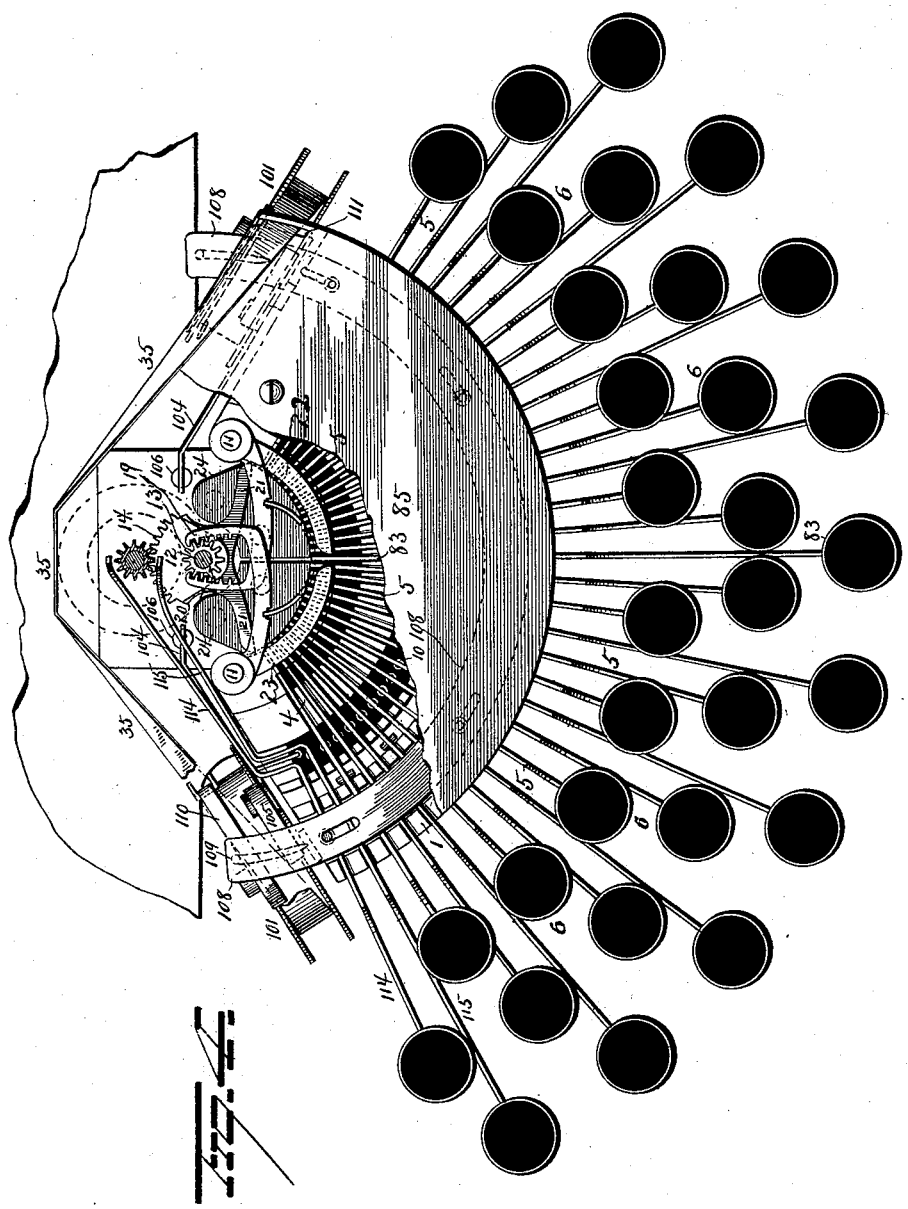

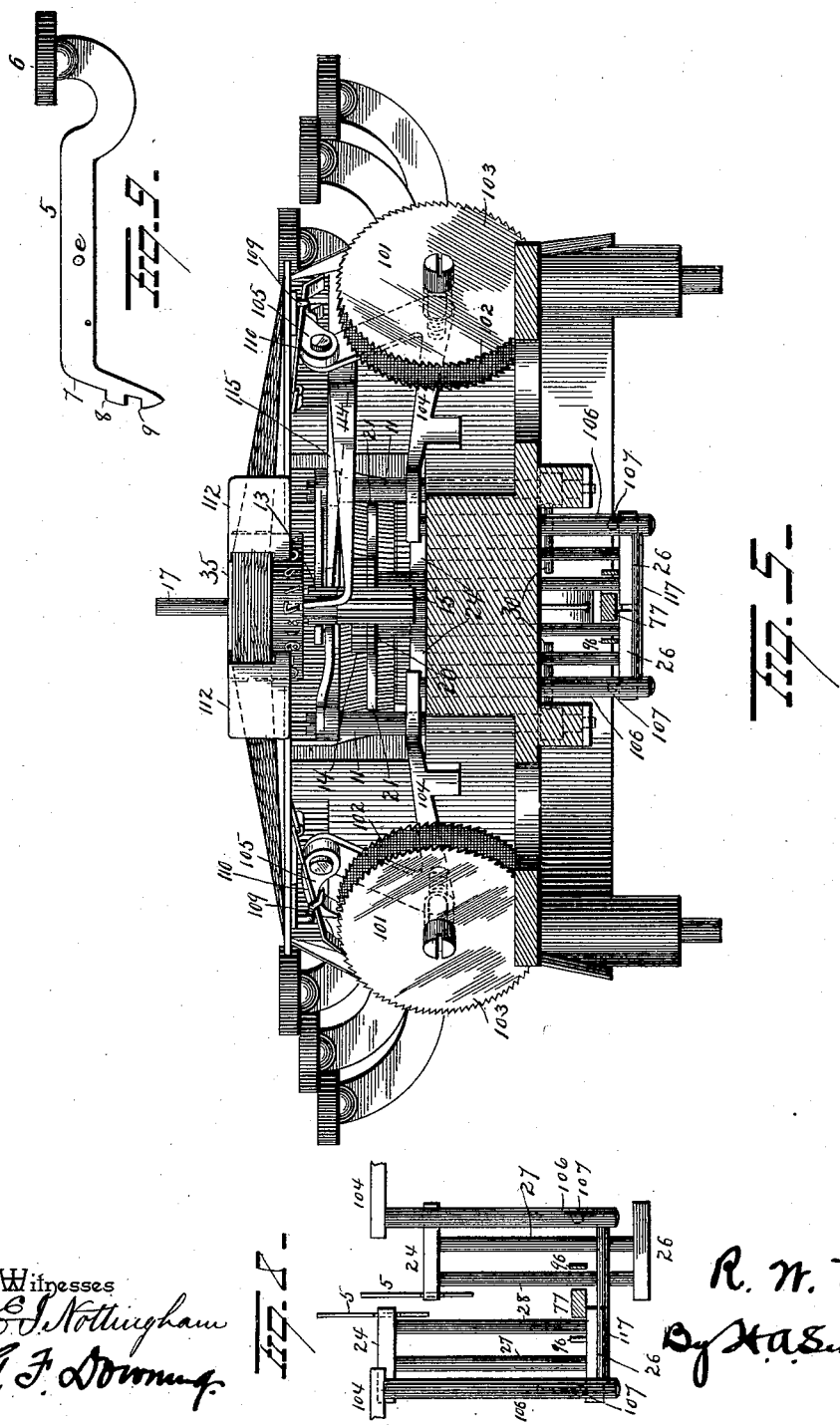

(No Model.)  
6 Sheets—Sheet 6.
R. W. UHLIG.
TYPE WRITING MACHINE.
No. 593,789.  
Patented Nov. 16, 1897.
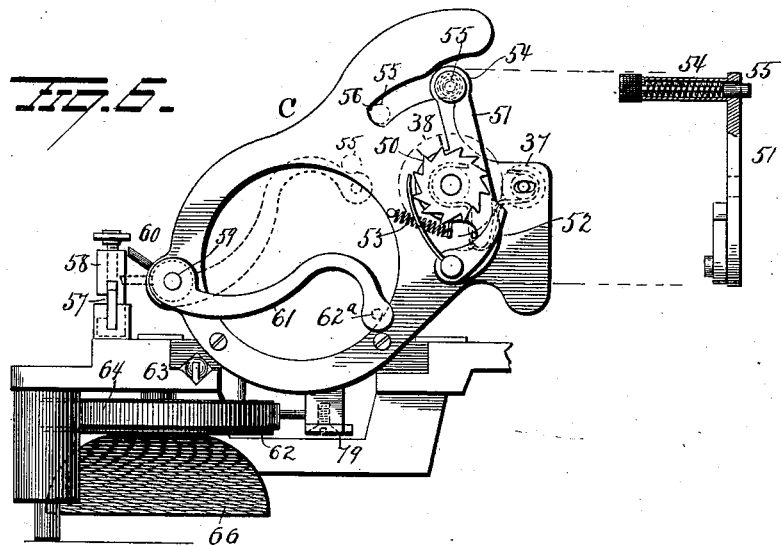
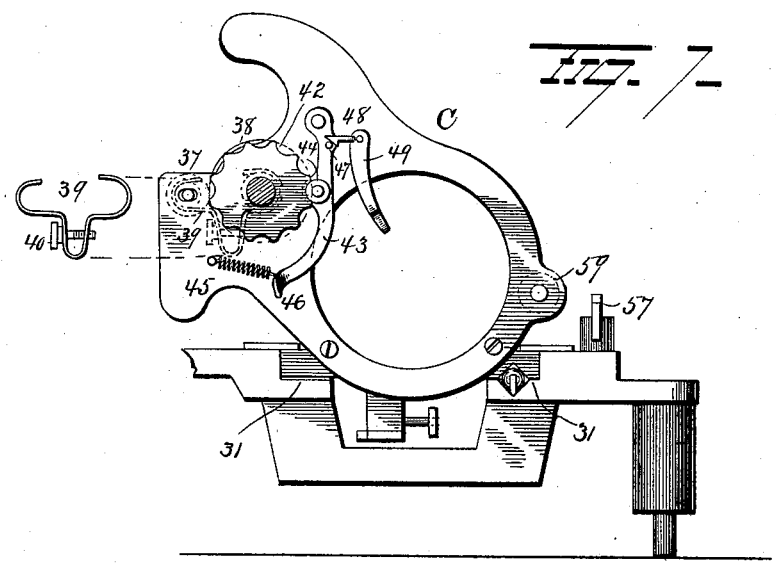
Witnesses  
E. J. Nottingham  
G. F. Downing
Inventor  
R. W. Uhlig  
By H. A. Seymour  
Attorney ved by

UNITED STATES PATENT OFFICE.

RICHARD W. UHLIG, OF COLLEGE POINT, NEW YORK, ASSIGNOR, BY MESNE ASSIGNMENTS, TO WILLIAM B. BALDWIN, OF YONKERS, NEW YORK.

TYPE-WRITING MACHINE.

SPECIFICATION forming part of Letters Patent No. 593,789, dated November 16, 1897.

Application filed November 14, 1896. Serial No. 612,139. (No model.)

*To all whom it may concern:*

Be it known that I, RICHARD W. UHLIG, of College Point, in the county of Queens and State of New York, have invented certain new and useful Improvements in Type-Writing Machines; and I do hereby declare the following to be a full, clear, and exact description of the invention, such as will enable others skilled in the art to which it appertains to make and use the same.

My invention relates to an improvement in type-writing machines, and more particularly to such as employ type-wheels, one object of the invention being to so construct a type-writing machine that it shall be simple, durable, compact, and readily portable.

A further object is to so construct a type-writing machine that it shall comprise a minimum number of parts coöperating on true mechanical principles to effectually and accurately perform all the functions required of modern machines of this class.

A further object is to obviate the use of an independent lock for the type-wheel and to so construct parts of the operating mechanism that they will serve, by wedging action, to hold the type-wheel in the position to which it may be set by the operation of a key.

A further object is to so construct the machine that the type-wheel will be held firmly in its normal position and so that the operation of any type-key will effect the release of the type-wheel, move the latter to writing position, and, securely holding it in such position, operate the dogs of the carriage-feed mechanism, put tension on the hammer-spring, release the hammer, and operate the ribbon-feed mechanism.

A further object is to provide simple and efficient means whereby to obviate any possibility of the type-wheel slipping or moving in any manner after having been set by the operation of a key-lever until the impression has been made on the paper and the key released by the operator.

A further object is to provide simple and efficient carriage-feeding mechanism.

A further object is to so construct the machine that should the alinement become imperfect from any cause it can be readily and quickly remedied by an inexperienced person and the necessity of employing an expert mechanic obviated.

A further object is to provide simple appliances for operating the dogs of the carriage-feed for effecting the movements of the carriage for spacing and for releasing the carriage.

A further object is to so construct the machine that any lost motion or play which might occur in the type-wheel-operating mechanism can be readily taken up or compensated for.

A further object is to construct the mechanism in such manner that a complete rotation of the type-wheel can be effected by the operation of key-levers which mark the segment of a circle.

A further object is to so construct the operating mechanism for effecting the rotation of the type-wheel that the movement of the key-levers shall be reduced to a minimum.

A further object is to provide a simple and efficient margin-stop.

A further object is to provide a type-writing machine of the class above mentioned with a simple and efficient ribbon-feeding mechanism and switch for changing the direction of movement of the ribbon.

A further object is to produce a type-writing machine simple, easy, and quick in operation, one in which the alinement can readily be maintained perfect, and to so construct the machine that it will effectually perform its functions.

With these objects in view the invention consists in certain novel and simple features of construction and combinations and arrangements of parts, as hereinafter set forth, and pointed out in the claims.

In the accompanying drawings, Figure 1 is a plan view of my improved type-writing machine with the top plate removed. Fig. 1ª is a detail view of the cover and partitions of the ribbon mechanism attached thereto. Fig. 2 is a bottom plan view. Fig. 3 is a sectional view. Fig. 4 is a plan view of a portion of the machine with the top plate partly broken away. Fig. 5 is a section on line *x x* of Fig. 1. Figs. 6 and 7 are end views showing the carriage. Figs. 8 and 9 are detail views.

A represents a framework made in a single casting and comprising a segmental front portion 1 for the reception and support of the keyboard and portions of the operating mechanism and a rear elongated portion 2 for the reception of the carriage. The front portion of the frame is made with segmental notched flanges 3 4 for the reception and guidance of key-levers 5, which latter terminate a short distance inwardly from the notched segmental flange 4, and the top of the part 1 of the frame is made with slots or recesses in line with the notches in the flanges 3 4 for the reception of the key-levers. The top of part 1 of the frame is also made with three segmental grooves $a\ b\ c$ for the reception of the pivot-pins $e$ of the key-levers, the latter being arranged in three sets of varying lengths, the fulcrums of the shorter levers being set in the groove $c$, the fulcrums of the longest levers being set in the groove $a$, and the fulcrums of the key-levers of intermediate length being set in the intermediate groove $b$. The key-levers are provided with the usual buttons or keys 6, and the forward end of each of said key-levers is made with a cam-face 7, a shoulder 8, and a hook 9, for purposes hereinafter more fully explained. Each key-lever is maintained normally in and returned to its normal position by means of small coiled springs 10.

By reference to Fig. 1 of the drawings it will be seen that the forward ends of the key-levers mark the segment of a circle, at the respective ends of which vertical shafts 11 are mounted in suitable bearings in the frame. A post 12 is located on the frame A at a point centrally between the shafts 11, and on this post a pinion 13 is loosely mounted and has secured to it a toothed segment 14, to mesh with an elongated pinion 15, carried by the hollow shank 16 of the type carrier or wheel B, said type carrier or wheel and its shank being loosely mounted on a vertical spindle 17, secured to the frame.

Arms or levers 18 are secured to the respective shafts 11 and project toward each other beyond the pinion 13, the free ends of said arms or levers being made with rack-bars 19, projecting therefrom practically at right angles and meshing with the pinion 13 at opposite sides thereof. Another toothed segment 20, adapted to mesh with the elongated pinion 15 of the type-wheel, is loosely mounted on the post 12 entirely independently of the toothed segment 14 and pinion 13 and provided with arms 21, said segment 20 and its arms 21 constituting what is known in machines of this class as the "flier," for stopping the type-wheel at the proper place when a key is depressed.

The key-levers are divided into two groups, one group adapted to rotate the type-wheel in one direction and the other group adapted to effect the reverse rotation of said type-wheel, the extreme keys of each group (which in this machine are located in the center of the keyboard) being adapted to cause a half-revolution in one direction or the other. To accomplish these results, I employ, in conjunction with appliances above described, two levers 22 23, which may for convenience be termed "type-wheel-operating" levers. The levers 22 23 are secured to the shafts 11 (or they may be made integral with the arms or levers 18) and project toward each other, marking, when in their normal positions, the segment of a circle coincident with the segment marked by the inner ends of the key-levers. The levers 22 23, the gearing with which they are connected, and the type-wheel are maintained normally in and returned to their normal position by means of a single bow-spring $24^a$, the ends of which have movable bearings against the arms or levers 18 and the intermediate portions of said spring bearing against the levers 22 23.

As above explained, the ends of the key-levers are made with cam-faces, and these cam-faces are so made that the various key-levers of each group will cause the lever 22 or 23 to be moved a different distance, so as to cause the type-wheel to revolve a sufficient extent to bring a particular letter to writing position. As the type-wheel is turned in one direction by the operation of one group of keys and in the reverse direction by the operation of the other group of keys, it is apparent that each key-lever of one group is adapted to move its coöperating lever 22 a different distance and that the key-levers of the other group at the other side of the machine have their cam ends similarly arranged to move the coöperating lever 23 different distances, according to the key being operated and the consequent amount of rotation of the type-wheel necessary to bring the proper letter into writing position.

From the construction and arrangement of parts above described it will be seen that when a key of one group is depressed the cam end of the key-lever will engage one of the levers 22 and force it forwardly, thus turning the shaft 11, to which it is connected, and causing one of the arms 18 to move in a small arc of a circle, whereby to transmit motion to the pinion 13 through the medium of the small rack-bar 19, carried by said arm or lever 18. The pinion 13 being thus turned motion will be transmitted by the toothed segment 14 to the elongated pinion 15 of the type-wheel, thus turning the latter to bring the desired type into writing position. When the type-wheel pinion 15 is thus rotated, motion will be imparted by it to the flier to cause the latter to turn in a direction opposite to that of the type-wheel until one of the arms of said flier engages the key-lever which has been operated, and by said key-lever the movement of the flier will be arrested, thus stopping the operation of the mechanism which actuated the type-wheel and bringing the latter to rest with the proper letter in position for writing.

When a key-lever is operated as above explained, motion is positively transmitted by one of the small rack-bars 19 to the pinion 13; but as both rack-bars are constantly in mesh with said pinion the other rack-bar will receive motion from the pinion 13, and thus the other arm or lever 18 will be moved and cause the lever 23 to be moved over the forward ends of some of the key-levers, there being ample space within the notched flange 4 to permit such movement of the lever 23.

It will of course be understood that when a key-lever of the group adjacent to the lever 23 is operated said lever will be moved, motion will be transmitted in the opposite direction to the type-wheel, and the lever 22 will project over the ends of key-levers of the other group.

Both rack-bars 19 are constantly in mesh with the pinion 13, regardless of what key-lever is operated, and neither is ever disengaged from said pinion to permit the operation of a key-lever of one group or the other.

This positive and continuous connection of both sets of type-wheel-operating devices with the type-wheel is a matter of importance and is permitted by the construction allowing the outward movement of the levers 22 23 over the ends of some of the key-levers and by mounting the flier loosely and independently of the pinion 13. By such construction I am enabled to dispense entirely with the employment of an independent lock commonly used on machines of the class to which my invention relates, which locks have caused more or less annoyance on account of becoming worn and failing to hold the type-wheel rigid when set in position for writing.

It is apparent from the construction and arrangement of the mechanism above described that when a key is depressed the rack-bars 19, meshing with the pinion 13, move in opposite directions, and that when their movements are stopped by the engagement of an arm of the flier with the key-lever which has been operated any further pressure exerted on the key-lever will tend to cause teeth of the respective rack-bars to impinge in opposite directions against teeth of the pinion 13; but as said pinion cannot now rotate, the gearing becomes wedged within itself and thus prevents any possible movement in any direction of the type-wheel until the key-lever shall have been released by the operator.

When a key is depressed by the operator, the upward movement of its forward or cam end will be limited by the engagement of the shoulder 7 with the adjacent type-wheel-operating lever 22 or 23. Should the parts of the type-wheel-operating mechanism become worn, so that upon the operation of a particular key-lever there will be some play or lost motion, which would result in the imperfect operation of the type-wheel, such play or lost motion can be readily compensated for by slightly reducing the shoulder 7 of the key-lever, so as to permit a slightly further movement of the forward or cam end of said key-lever and thus effect a slightly further movement of the adjacent arm or lever 22 or 23 sufficient to compensate for the lost motion or play and bring the type-wheel to its proper writing position in accordance with the key-lever which has been operated.

It will be observed that the key-levers project forwardly beyond the notched flange 4 and that the free forward extremities of said key-levers are slightly spaced apart. This arrangement is important in that it permits the forward or cam ends of the levers to be moved slightly laterally in one direction or the other for the purpose of effecting or correcting the alinement of writing. It is apparent that if the cam end of a key-lever be bent laterally in one direction or the other the operation of said key-lever will result in a slightly greater or less movement of the coöperating arm or lever 22 or 23, and thus so regulate the movement of the gearing and the type-wheel as to insure the accurate setting of the desired letter in position for writing.

Within the segmental space under the arms 18 22 23 two plates 24 are disposed and normally supported on seats 25, formed by the framework. Each plate 24 is connected with plates 26, disposed below the seat 25, by means of rods 27 28, passing loosely through the portion of the frame which constitutes said seat, the lower portion of each rod 27 being beveled, so as to form cam-faces 29, against which pins 30, projecting from the shaft 11, are adapted to ride. Each pair of plates 24 26 and their connecting-rods constitute a vertically-movable frame, the four plates with their connecting-rods thus forming two such frames. When a key-lever is depressed, the hook 9 at the cam end thereof will engage the under face of one of the plates 24 and thus raise one of the vertically-movable frames. When a vertically-movable frame is thus raised, the cam-face 29 of the rod 27 will be raised above the pin 30 on shaft 11 and thus permit said shaft to turn and allow the operation of the arm or lever 22 connected to it. The pin 30 on the shaft 11 of arm or lever 23 will bear against the rod 27 of the other frame and thus prevent any possible movement of the arm or lever 23 toward the type-wheel while the arm or lever 22 is being operated. Of course when a key at the other side of the machine is operated to actuate the arm or lever 23 the arm or lever 22 and its shaft 11 remain locked and the shaft 11 and arm or lever 23 is released in the same manner as above described. When the key-lever shall have been released by the operator, the vertically-movable frame which had been raised by said key-lever will be released and permitted to fall by its own gravity. As said vertically-movable frame approaches its normal position the cam-face 29 of rod 27 will engage the pin 30 and positively turn the shaft 11 to which it is connected and thus return the coöperating lever 22 or 23, the gearing, and the type-wheel to their normal positions. Thus it will be seen that the type-wheel and its operating mechanism will be returned to their normal positions by the weight of the vertically-movable frames as they descend to assume their normal positions. The spring 24ª above described for returning the parts to their normal positions can therefore be dispensed with, if desired, but I prefer to use said spring to quicken the return of the parts and to assist the vertically-movable frames in performing this function.

It will be seen that when the parts are in their normal positions the pins in both shafts 11 will bear against the rods 27 at points above the cam-faces of the latter, and thus the shafts 11 will be prevented from any possible movement until a key-lever is operated. Thus it will be seen that the gearing which actuates the type-wheel, and consequently the type-wheel itself, will be normally locked.

The portion 2 of the frame A of the machine is made with guideways 31 for the accommodation of the carriage C of the machine. An arm 32 is secured to the rear part of the frame and projects over the carriage, terminating a short distance from the type-wheel. The horizontal portion of the arm 32 is adapted to constitute a bearing for an impression-hammer 33, which latter is maintained in and returned to its normal position by means of a spring located within the arm 32, and the inner end of said impression-hammer is provided with a removable cushion or head 34. An important reason for making the rubber cushion or head 34 removable is to permit the use of a comparatively hard cushion when manifold writing is desired or a comparatively soft one when a single impression is to be made. An inking-ribbon 35 passes between the head 34 of hammer 33 and the type-wheel and is fed in a manner hereinafter explained. The paper to be written upon is placed within a cylinder 36, as usual in machines of this class, and passes up between feed-rollers 37 38, mounted in the carriage, and between the type-wheel and the hammer-head 34. The feed-roller 37 is mounted in elongated bearings and pressed against the feed-roller 38 by means of springs 39. Each of these springs is made approximately V-shaped, and its respective arms bear against the journals of the respective rollers. The arms of each spring 39 will preferably be connected by a set-screw 40, whereby to regulate the tension of the spring and the pressure exerted by the rollers on the paper.

One journal of the roller 38 is extended beyond its bearing and provided with a knob 41 and a star-wheel 42. A detent 43 is pivoted at one end to the carriage and provided between its ends with a detent-roller 44 to engage the star-wheel 42, with which it is maintained in contact by means of a spring 45. The detent 43 is provided with a thumb-piece 46, by which the roller 44 can be moved away from the star-wheel, so as to permit the free movement of the feed-roller 38 when it is desired to move the paper for any reason. When the detent is thus moved back, a pin 47 thereon will be engaged by a hook 48 on a pivoted arm 49, and the detent will thus be held out of engagement with the star-wheel. When the paper shall have been adjusted by turning the feed-roller 38, the pivoted arm 49 will be moved by the operator, so as to release the pin 47 from the hook 48 and permit the detent-roller to again engage the star-wheel. The journal at the other end of the feed-roller 38 is provided with a ratchet-wheel 50, and on said journal a lever 51 is loosely mounted. To the lower end of said lever a spring-dog 52 is attached and adapted to engage the ratchet-wheel 50. The lever 51 is maintained in and returned to its normal position by means of a spring 53. The upper end of the lever 51 is made with a hollow arm 54, in which a spring-pressed dog 55 is mounted and adapted to engage a stop 56, made in the frame of the carriage, whereby to limit the movement of the lever 51 and thus regulate the movement of the roller 38 when the lever is operated to move the paper for a new line of writing. Should it be desired to move the paper for a double space, the dog 55 will be withdrawn by pulling it longitudinally, whereby to permit a further movement of the lever 51 and a sufficient rotation of the feed-rollers to move the paper for a double space. A rack-bar 57 is attached to the rear portion of the frame for the reception of an adjustable stop 58. An oscillatory rod 59 is mounted on the carriage and provided with a pin 60. To one end of the rod 59 an arm 61 is attached and provided at its free end with a pin 62ª, which rests on one end of the paper-cylinder, the weight of said arm 61 serving to normally maintain the pin 60 out of line with the stop 58. These devices constitute a simple and efficient margin-stop whereby to limit the movement of the carriage when it is desired to leave a margin at one side of the paper. It is apparent that when the stop 58 shall have been set for the desired margin and the arm 61 raised by the operator the pin 60 will be brought in line with the stop 58, and the return movement of the carriage will thus be limited. The arm 61 will then be released by the operator, whereupon said arm 61 will fall and the pin 60 will be moved out of line with the stop 58 and permit the carriage to be moved back to its full extent for the next line of writing.

The carriage C is adapted to be propelled by means of a spring-actuated drum 62, supported on the frame A by means of a stud 63 and connected with the carriage by means of a strap 64, one end of said strap being attached to the carriage and the other end attached to a pin 65 on the periphery of the spring-drum. A bell 66 is attached to the drum 62 and turns with it. The drum may be provided with several pins 65, and when it is desired to adjust the tension of the spring in drum 62 the strap may be removed from the drum, the drum turned by grasping the bell, and the strap again attached to the drum. A sleeve 67 is mounted on a stud on the frame and provided with a bell-hammer arm 68. An arm 69 projects from said sleeve 67 and carries a spring-actuated dog 70, to be engaged by a pin 71 on the carriage, whereby to withdraw and then release the bell-hammer, which latter will then be forced in contact with the bell by means of a spring 72.

The under face of the frame is made with lugs 73, having screw-threaded perforations for the accommodation of transverse screw-threaded shafts 74, on which a plate 75 is loosely mounted and maintained in and returned to its normal position by means of a spring 76. From one end of the pivotally-supported plate 75 an arm 77 projects and is normally disposed over the lower plates 26 of the vertically-movable frames. The other end of the plate 75 is made with a tooth 78, adapted to engage the ratchet-bar 79 on the carriage, said tooth constituting the fixed dog of the step-by-step feed mechanism for the carriage. The movable dog 80 of said feed mechanism is pivotally attached to the plate 75 and adapted to be actuated by a single bow-spring 81, the tension of said spring being adjustable by means of a cam 82, attached to the plate 75. It is apparent that the ratchet feed mechanism can be readily adjusted by means of the screw-threaded shafts 74. From this construction it will be seen that when a key-lever is depressed and one of the vertically-movable frames raised, as above explained, the engagement of the plate 26 with the arm 77 will turn the plate 75 on its fulcrum and permit the carriage to move one tooth of the ratchet-bar on the carriage.

To effect spacing between words, a key-lever 83 is provided and connected by means of a wire 84 with the arm 77 of plate 75, said key-lever being limited in its movement by means of a top plate 85.

In order to move the ratchet devices of the feed mechanism entirely free of the ratchet-bar on the carriage, whereby the carriage can be moved freely to starting position or so that it can be freely moved when it is desired to insert a letter or word in a line of writing, an arm 86, having a thumb-piece 87, is pivotally attached to the front portion of the frame and loosely attached to the arm 77 of plate 75. It is apparent that by pressing the key or thumb-piece 87 the carriage will be released.

The impression-hammer 33 above alluded to will be actuated to force the inking-ribbon and the paper toward the type-wheel when a key is depressed by means of devices now to be described. The part 2 of the frame A is made with two depending lugs 88, between which the trunnions 89 of a force-hammer 90 are supported, said hammer 90 being adapted to be made to strike the impression-hammer. The force-hammer is returned to its normal position by means of a weight 91, attached thereto, in which position it is retained by means of the engagement of the bifurcated notched end of an L-shaped trip-lever 92, with pins 93 projecting laterally from the force-hammer, which lever is pivotally supported at the juncture of its two arms by the arm 32. The notched portions of the lever 92 are made to properly receive the pins 93 by means of a weight 94, attached to said lever. A yoke 95 is loosely mounted on the trunnions of plate 75, the arms 96 of said yoke terminating over the plates 26 of the vertically-movable frames. At the other end of the yoke the arms 96 unite to form a single arm 97, provided at or near its free end with laterally-projecting pins 98, said arm 97 terminating somewhat above the lower end of the L-shaped trip-lever 92. Springs 99 are coiled on the trunnions 89 of the force-hammer and attached at one end thereto. The other ends of the springs 99 are extended to form arms 100, which normally bear lightly on the pins 98. From this construction and arrangement of parts it will be seen that when a key is depressed and one or the other of the vertically-movable frames raised, as hereinbefore explained, the lower plate 26 of the frame thus raised will cause the yoke 95 to be turned on its fulcrum and the rear end thereof (arm 97) depressed. The first downward movement of the arm 97 of yoke 95 will depress the arms 100 of the springs 99 and thus subject said springs to tension—in other words, wind said springs. As the arm 97 of yoke 95 continues its downward movement it will engage the trip-lever 92 and move the notched bifurcated end of the latter out of contact with the pins 93 of the force-hammer. The force-hammer is thus released and the springs 99 permitted to act to cause said hammer to strike the impression-hammer with a quick blow and effect the impression of a type on the paper, as will be readily understood. As soon as the key is released the force-hammer will be permitted to fall back to its normal position in engagement with the trip-lever.

It may be here stated that when a key is depressed the type-wheel will be set in position for writing before the force-hammer is tripped.

In order to shift the type-wheel for different type-rows thereon—for instance, for capital letters and figures—two key-levers 114 and 115 will be employed, said levers being so constructed and mounted that they will engage the bottom of the type-wheel and one serve to raise the type-wheel twice as far as the other, whereby to bring the capital letters and figures to writing position.

It now remains to describe the construction and operation of the devices for supporting and feeding the inking-ribbon.

Ribbon-reels 101 are loosely mounted at the respective ends of the segmental front portion 1 of the frame, and each side of each reel is made with ratchet-teeth, so as to form two ratchet-wheels 102 103. On the studs which support the ribbon-reels approximately L-shaped levers 104 are loosely mounted, and one arm of each of said levers carries a pivoted dog 105, adapted to engage the ratchet-wheels 102 of each pair. The other arms of the levers 104 are preferably weighted and disposed directly over vertically-movable rods 106, which project loosely through the framework and in proximity to their lower ends are provided with pins 107, which normally rest on the bottom plates 26 of the vertically-movable frames. The lower ends of the rods 106 are connected together by means of a cross-bar 117, so as to cause said rods to move together. A segmental sliding bar or switch 108 is mounted on the under side of the top plate 85 and provided at its respective ends with cam-shaped arms 109, adapted to maintain one of the dogs elevated while the other is operating. Dogs 110 are pivotally connected to the ends of the top plate 85 and adapted to engage the ratchet-wheel 103 of the reel on which the ribbon is being wound, whereby to prevent the return movement of the dog 105 turning the ribbon-reel backwardly. The cam-arm 109 at one end of the top-plate 85 not only serves to hold up the dog 105 from the ribbon-reel from which the ribbon is being drawn, but it also holds up the dog 110 from said reel. It is apparent that when the segmental switch-bar is moved from one end to the other of its throw the dogs 105 110 over one ribbon-reel will be raised and those over the other reel will be lowered, thus changing the direction of feed of the ribbon. It will be seen that when a key-lever is depressed the upward movement of one of the vertically-movable frames will cause the lower plate 26 of said frame to engage the pin 107 on one of the rods 106 and raise both of said rods, thus imparting motion to the levers 104 and causing one of the dogs 105 to engage one of the ratchet-wheels of one of the reels and move the latter to wind the inking-ribbon. The inking-ribbon is passed through guides 111 at the ends of the plates and through slots or guides in arms 112, projecting from a flange 113 on the top plate 85, said arms 112 also serving as guards for the paper.

In constructing the type-wheel I prefer to make it of light material, preferably hard rubber. The wheel comprises a ring 118, having an internal perforated web 119, to which the shank 16 is attached, said shank having a plate 120 secured to it, and from this plate a pin 121 projects through the web of the wheel, thus holding the wheel rigidly on the shank. The type may be made on a thin metal strip secured to the periphery of the wheel.

Various slight changes might be made in the details of construction of my invention without departing from the spirit thereof or limiting its scope, and hence I do not wish to limit myself to the precise details herein set forth; but, Having fully described my invention, what I claim as new, and desire to secure by Letters Patent, is—

1. In a type-writing machine, the combination with a type-carrier, and key-levers, of gearing connected with the type-carrier, two operating-levers in constant connection with said gearing and coöperating with the key-levers and a flier coöperating with the type-carrier and key-levers, whereby both of said operating-levers and flier will be actuated when a key-lever is depressed and lock the type-carrier by the wedging action of the gearing, substantially as set forth.

2. In a type-writing machine, the combination with a type-carrier, and two groups of key-levers, of two levers coöperating with the respective groups of key-levers, and gearing between said coöperating levers and the type-carrier, said gearing being connected constantly with said levers and with the type-carrier, whereby when a key-lever of either group is operated, both of the coöperating levers and gearing connecting them with the type-carrier will be actuated, and a flier actuated by said gearing and adapted to be stopped by engagement with a key-lever when the latter has been operated, substantially as set forth.

3. In a type-writing machine, the combination with a type-carrier and a series of key-levers, of gearing connected with said type-carrier, and levers in constant connection with said gearing, said levers coöperating with the key-levers in such manner that when one is moved forwardly, the other will be moved over key-levers, substantially as set forth.

4. In a type-writing machine, the combination with a type-carrier, a pinion adapted to transmit motion thereto, key-levers and a flier actuated when said pinion is moved, to strike a key-lever, of two sets of actuating devices between said key-levers and pinion, both sets of actuating devices being in constant connection with said pinion and coöperating with the flier to hold the type-carrier fixed when set to writing position, substantially as set forth.

5. In a type-writing machine, the combination with a type-carrier and gearing connected therewith, of two levers in constant connection with said gearing so that any movement of one lever will result in a corresponding movement in the opposite direction of the other lever and transmit motion to the type-carrier, and a series of key-levers having cam ends to coöperate respectively with said first-mentioned levers, and move the same different distances, in accordance with key-lever operated, substantially as set forth.

6. In a type-writing machine, the combination with a type-carrier and a pinion adapted to transmit motion thereto, of type-levers having cam ends, pivoted levers to be engaged by the cam ends of the key-levers, rack-bars carried by said pivoted levers and meshing with said pinion, and a single spring bearing at its ends against the rack-bars and between its ends against said pivoted levers, substantially as set forth.

7. In a type-writing machine, the combination with a type-carrier having an elongated pinion, of a combined pinion and toothed segment, the latter to mesh with the elongated pinion, of key-levers having cam ends, pivoted levers to be engaged by said cam ends of the key-levers, and rack-bars carried by said pivoted levers and meshing with the pinion to which the toothed segment is secured, substantially as set forth.

8. In a type-writing machine, the combination with a type-carrier having an elongated pinion, of a combined toothed segment and pinion, the former meshing with said elongated pinion, key-levers, rack-bars meshing with the pinion which carries the toothed segment, connections between said rack-bars and key-levers, and a flier mounted independently of said combined toothed segment and pinion and adapted to receive motion from the elongated pinion of the type-carrier, substantially as set forth.

9. In a type-writing machine, the combination with a type-carrier carrying an elongated pinion and a series of key-levers, of a flier consisting of a toothed segment having arms, said toothed segment meshing with said elongated pinion, a combined toothed segment and pinion mounted on the same stud with the flier but independently thereof and adapted to transmit motion to the elongated pinion of the type-carrier, rack-bars meshing with the pinion of the combined toothed segment and pinion and connections between said rack-bars and the key-levers, substantially as set forth.

10. In a type-writing machine, the combination with a frame having a segmental guiding-flange, a type-carrier and gearing connected with said type-carrier, of a series of key-levers mounted on the frame and terminating forwardly of said guiding-flange and spaced apart at their forward extremity whereby to permit the free forward ends of the key-levers to be bent laterally within the segmental guiding-flange, said forward extremities of the key-levers having cam-faces to actuate said gearing, substantially as set forth.

11. In a type-writing machine, the combination with a type-carrier and gearing connected therewith, of a pivoted lever adapted to mark the arc of a circle and constructed to transmit motion to said gearing and a series of key-levers having cam ends to engage said lever and move the same different distances and a shoulder on one end of the cam of each key-lever, said shoulders being adapted to engage the first-mentioned lever when a key-lever has been fully depressed, substantially as set forth.

12. In a type-writing machine, the combination with a type-carrier and gearing connected therewith, of levers coöperating with said gearing, devices constructed to lock said levers and gearing in their normal positions and key-levers constructed to coöperate with said first-mentioned levers and locking devices, whereby to actuate said levers and gearing and move the type-carrier to writing position according to the key-lever operated, substantially as set forth.

13. In a type-writing machine, the combination with a type-carrier and key-levers, of gearing between the type-wheel and key-levers, said gearing being constructed and adapted to hold the type-carrier rigid when set to writing position, and devices connected with said gearing and adapted to positively lock the type-wheel in normal position, substantially as set forth.

14. In a type-writing machine, the combination with a type-carrier, and gearing connected with said type-wheel, of levers connected with said gearing, key-levers having cam ends to engage said first-mentioned levers, and vertically-movable frames constructed and adapted to lock the type-wheel and gearing in their normal positions, and hooks or projections on the key-levers for raising one or the other of said vertically-movable frames and thus unlocking the gearing and type-wheel, substantially as set forth.

15. In a type-writing machine, the combination with a type-carrier having an elongated pinion, of a combined toothed segment and pinion, the former meshing with the elongated pinion, oscillatory shafts, rack-bars secured to said shafts and meshing with the pinion carrying the toothed segment, levers projecting from said shafts, key-levers having cam ends to engage said levers, a vertically-movable frame having cam-faces, and pins on said shafts to engage said frames and adapted to be moved by said cam-faces, substantially as set forth.

16. In a type-writing machine, the combination with a type-carrier and an impression-hammer, of a force-hammer, a normally loose spring connected with the force-hammer, a trip device normally locking said force-hammer, key-levers and devices operated by the key-levers and constructed and adapted to first apply tension to said spring while the force-hammer is locked and then operate said trip to release the force-hammer, substantially as set forth.

17. In a type-writing machine, the combination with a type-carrier and an impression-hammer, of a force-hammer, a trip device serving to normally lock the force-hammer, a normally loose spring for the force-hammer, a pivoted yoke, key-levers and connections between one end of said yoke and the key-levers, the other end of said yoke being adapted to apply tension to said spring while the force-hammer remains locked and then operate the trip, when a key-lever is pressed, substantially as set forth.

18. In a type-writing machine, the combination with a type-carrier and an impression-hammer, of a force-hammer, a normally loose spring therefor, a trip device serving to normally lock said force-hammer, key-levers, vertically-movable frames adapted to be raised by the key-levers, and a pivoted yoke having arms disposed over portions of the respective vertically-movable frames and also having an arm connected with the force-hammer spring and adapted to operate said trip device to release the force-hammer, substantially as set forth.

19. In a type-writing machine, the combination with a carriage and a ratchet-bar thereon, of a pivoted plate having a fixed dog at one end to engage said ratchet-bar, a dog pivoted to said plate and adapted to coöperate with the first-mentioned dog, a single bow-spring bearing against the pivoted dog, means for adjusting said bow-spring, vertically-movable frames, an arm projecting from said pivoted plate and terminating over portions of both frames, and key-levers adapted to raise said vertically-movable frames, substantially as set forth.

20. In a type-writing machine, the combination with a carriage and a ratchet-bar thereon, of a pivoted plate, ratchet devices carried by said plate coöperating with the ratchet-bar to effect the feed of the carriage, an arm projecting from said pivoted plate, a key-lever connected with said arm whereby to actuate the ratchet devices to effect a step-by-step feed of the carriage, means for limiting the movement of said key-lever, and a key connected with the arm of the pivoted plate whereby to move the dogs out of engagement with the ratchet-bar and effect the release of the carriage, substantially as set forth.

21. In a type-writing machine, the combination with a type-carrier having a pinion and key-levers having cam ends, of a combined toothed segment and pinion, two oscillatory shafts, rack-bars carried by said shafts and meshing with said last-mentioned pinion, two levers, one secured to each oscillatory shaft, said levers being normally disposed coincident with the segment of a circle marked by the cam ends of the key-levers, substantially as set forth.

22. In a type-writing machine, the combination with vertically-movable frames and key-levers adapted to raise said frames, of ribbon-reels having ratchet-teeth, pivoted levers, a dog pivoted to one arm of each of said levers and adapted to engage ratchet-teeth of the ribbon-reels, vertically-movable rods adapted to engage the other arms of said levers, and pins projecting from said rods and adapted to be engaged by portions of said vertically-movable frames, substantially as set forth.

23. In a type-writing machine, the combination with a framework and a top plate, of key-levers, vertically-movable frames to be raised by said key-levers, ribbon-reels mounted on the framework and each comprising two ratchet-wheels, a pivoted lever adjacent to each ribbon-reel, a dog carried by one arm of each lever and adapted to engage one ratchet-wheel of each reel, vertically-movable rods to engage the other arms of said levers, a cross-bar connecting said rods, pins projecting from said rods and over portions of the vertically-movable frames, a sliding switch-bar on the top plate of the machine, dogs pivoted to said top plate to engage a ratchet-wheel of the ribbon-reels and cam-arms carried by said switch-bar and adapted to raise the dogs from the ratchet-wheels of one reel and permit the dogs of the ratchet-wheels of the other reel to engage the same, substantially as set forth.

24. In a type-writing machine, the combination with the framework and a carriage, of a bar secured to the framework, a stop adjustably secured to said bar, an oscillatory rod mounted on the carriage, a pin on said rod, normally out of line with said stop, and an arm secured to said rod for maintaining said pin out of line with the stop and serving as means whereby to oscillate said rod to move the pin in line with the stop, whereby to regulate the margin on the paper being written upon, substantially as set forth.

25. In a type-writing machine, the combination with a framework and a carriage, of a ratchet-bar secured to the framework, a stop adjustably secured to said ratchet-bar, an oscillatory rod mounted on the carriage, a pin on said rod normally out of line with said stop, an arm on said rod for normally maintaining said pin out of line with the stop and serving as means whereby to oscillate the rod to move the pin on the latter in line with said stop, and a pin on said arm to engage the carriage and form a stop for said arm and oscillatory rod, substantially as set forth.

26. In a type-writing machine, the combination with a carriage and paper-feed rollers mounted therein, of a star-wheel and a knob on one of the journals of one of said rollers, a pivoted detent, a roller carried by said detent and adapted to engage the star-wheel, a spring attached to the free end of said detent and to the carriage, a pin on the detent, a pivoted arm and a hook on said pivoted arm to engage said pin, substantially as set forth.

27. In a type-writing machine, the combination with the framework, a carriage and ratchet feed mechanism for the carriage, of a combined spring-actuated drum and bell, a strap attached at one end of the carriage and removably attached at the other end to the spring-actuated drum, and a hammer for said bell attached to the frame of the machine and carrying a trip device to be actuated by a projection on the carriage, substantially as set forth.

28. In a type-writing machine, the combination with a framework having two segmental notched flanges, radial slots and segmental grooves in its top, of key-levers guided by said notched flanges and radial slots and having pivot-pins seated in said segmental grooves, said key-levers terminating within the inner segmental flange, a type-wheel and gearing between said type-wheel and key-levers and adapted to be actuated by the inner ends of the latter to turn said type-wheel, substantially as set forth.

29. In a type-writing machine, the combination with a carriage and paper-feed rollers, of a ratchet-wheel on one of the journals of one of said rollers, a pivoted lever carrying a dog to engage said ratchet-wheel, a tubular arm on said lever, and a spring-actuated dog mounted in said tubular arm and adapted to engage a stop on the carriage or to be moved out of line with said stop, substantially as set forth.

30. In a type-writing machine, a type-wheel consisting of a ring having a perforated web, a hollow shank extending through said web, a plate on the shank on which plate said web rests, a pin projecting from said plate and entering the web and a strip containing characters, on said ring, substantially as set forth.

In testimony whereof I have signed this specification in the presence of two subscribing witnesses.

RICHARD W. UHLIG.

Witnesses:
C. S. DRURY,
R. S. FERGUSON.